United States Patent Office 3,409,611
Patented Nov. 5, 1968

3,409,611
16,20-CYCLOSTEROIDS
Milton Heller and Seymour Bernstein, New City, N.Y., assignors to American Cyanamid Company, Stamford, Conn., a corporation of Maine
No Drawing. Filed May 16, 1966, Ser. No. 550,125
10 Claims. (Cl. 260—239.55)

This invention relates to new steroid compounds. More particularly, it relates to 16, 20 ring substituted pregnenes.

The novel pregnenes of the present invention may be illustrated by the formula:

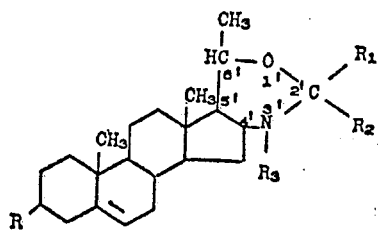

and

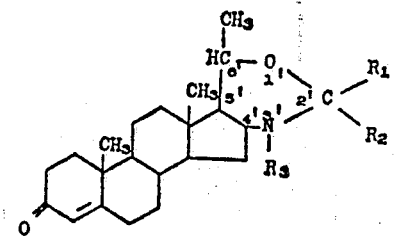

wherein R is selected from the group consisting of hydroxy, lower alkanoyloxy, formyloxy and

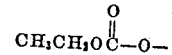

$R_1$ and $R_2$ are selected from the group consisting of hydrogen and lower alkyl; $R_3$ is selected from the group consisting of hydrogen, loweralkyl and loweralkanoyl.

The compounds of the present invention can be prepared as shown in the following flowsheet.

FLOWSHEET

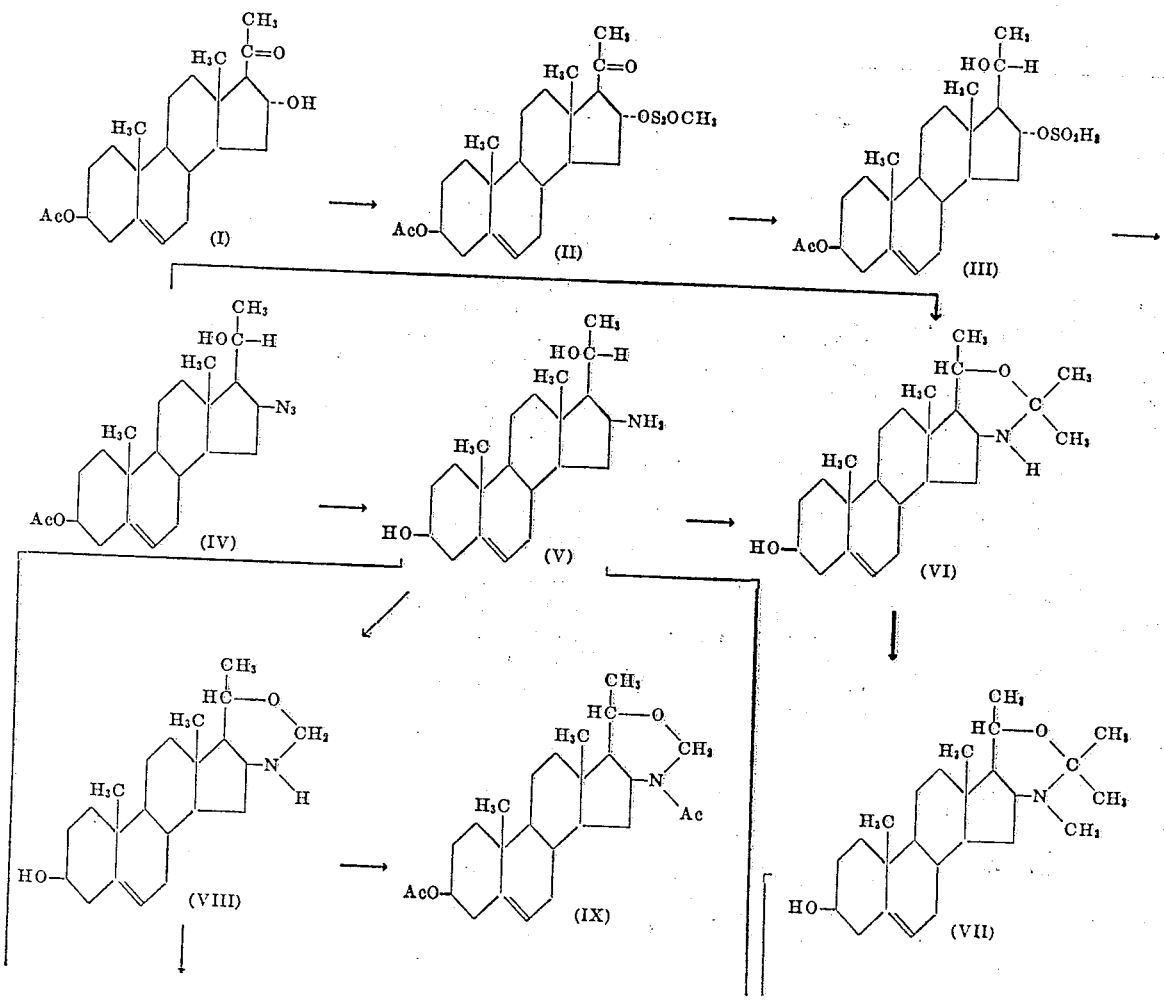

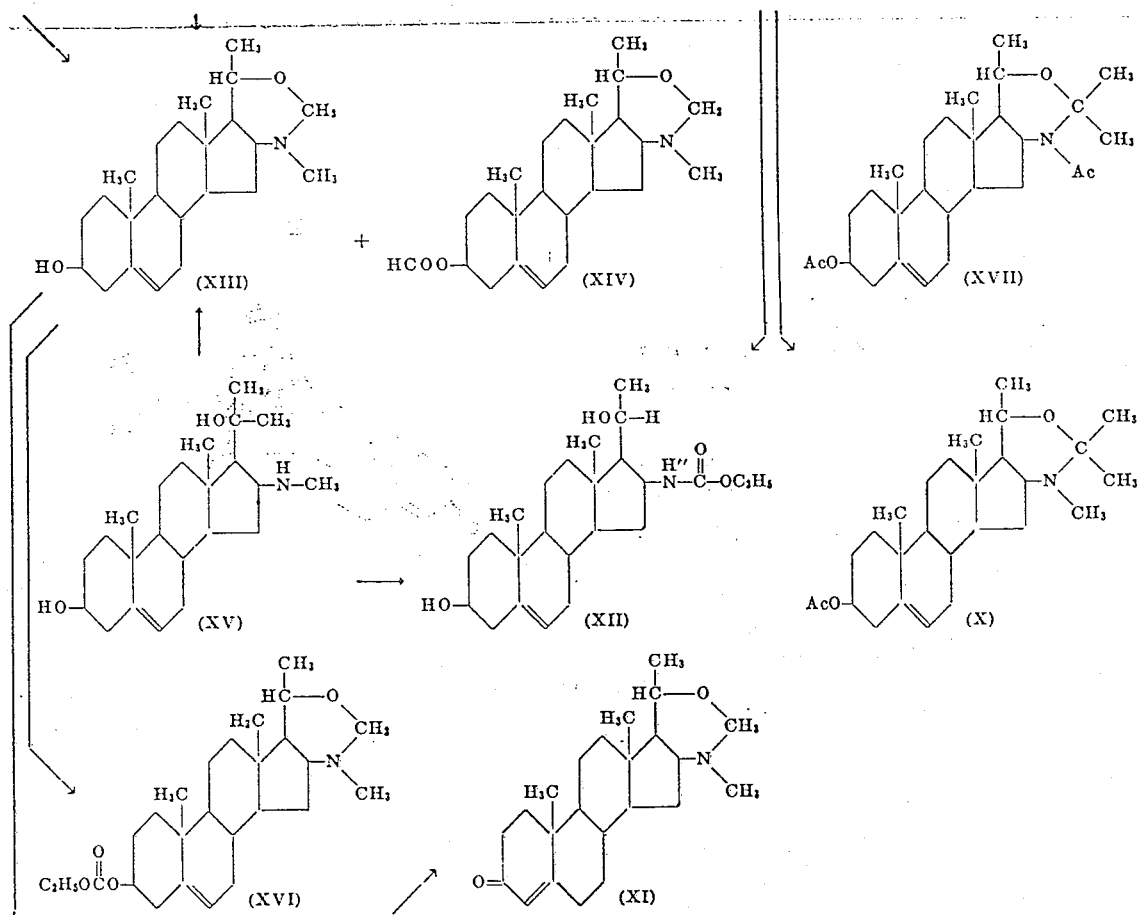

wherein Ac is a lower alkanoyl radical.

In the above flowsheet, the compound 3β-acetoxy-16α-hydroxypregn-5-en-20-one (I) [prepared according to J. Org. Chem., 19, 131 (1954)] is reacted with methanesulfonyl chloride in the presence of pyridine to produce 3β-acetoxy-16α-methane-sulfonyloxypregn - 5 - en - 20β - one (II). The latter compound when reacted with sodium borohydride in a lower alkanol, produces 3β-acetoxy-16α-methanesulfonyloxypregn-5-en-20β-ol (III). The latter compound when heated with sodium azide, gives 3β-acetoxy-16β-azidopregn-5-en-20β-ol (IV). The latter 16β-azide compound when heated with lithium aluminium hydride in a solvent, produces 16β-aminopregn-5-en-3β,20β-diol (V). Also, the reduction of 16β-azide (IV) with lithium aluminium hydride and crystallization from acetone produces 2′,2′,6′(R)-trimethyl-2′,3′,4′,5′-tetrahydro - 1′,3′ - oxazino[4′,5′:16β,17β] - androst-5-en-3β-ol (VI). The latter compound when reacted with acetic anhydride in the presence of pyridine, produces 3′-acetyl-2′,2′,6′(R)-trimethyl-2′,3′,4′,5′-tetrahydro-1′,3′ - oxazino [4′,5′:16β,17β]androst-5-en-3β-ol acetate (XVII). When the trimethyl-1,3-oxazine (VI) is heated with methly iodide in the presence of potassium carbonate, the product 2′,2′,3′,6′-(R)-tetramethyl - 2′,3′,4′,5′ - tetrahydro - 1′,3′-orazino[4′,5′:16β,17α]androst-5-en-3β-ol (VII) is produced. The latter compound on acetylation with acetic anhydride in the presence of pyridine, produces 2′,2′,3′,6′ (R) - tetramethyl - 2′,3′,4′,5′ - tetrahydro - 1′,3′ - oxazino [4′,5′:16β,17β]androst-5-en-3β-ol-acetate (X). When 16β-androst-5-ene-3β-ol (XIII) and 3′,6′-dimethyl-2′,3′,4′,5′-aminopregn-5-ene-3β20β-diol (V) is heated with formic acid and formaldehyde, the products resulting are 3′,6′(R)-dimethyl-2′,3′,4′,5′-tetrahydro-1′,3′-oxazino[4′,5′:16β17β] androst-5-en-3β-ol (XIII) and 3′,6′-dimethyl-2′3′,4′,5′-tetrahydro - 1′,3′ - oxazino[4′,5′:16β,17β]androst - 5 - en-3β-ol formate (XIV).

The 1,3-oxazino compound (XIII) when reacted with ethylchloroformate in pyridine, produces 3′,6′(R)-dimethyl 2′,3′,4′,5′-tetrahydro-1′,3′-oxazinol[4′,5′:16β,17β] androst-5-en-3β-ol, ethyl carbonate (XVI). Also, when the 1,3-oxazino compound (XIII) is reacted with chromic acid and sulfuric acid in the presence of a solvent, the product 3′,6′ - (R) - dimethyl - 2′,3′,4′,5′-tetrahydro-1′,3′-oxazino[4′,5′:16β,17β]androst-4-en-3-one (XI) is obtained. On reacting 16β-aminopregn-5-en-3β,20β-diol (V) with formaldehyde in a solvent, the product 6′(R)-methyl-2′,3′,4′,5′ - tetrahydro - 1′,3′ - oxazino[4′,5′:16β,17β]androst-5-en-3β-ol (VIII) is obtained. The latter compound when heated with acetic anhydride in the presence of a solvent, produces 3′-acetyl-6′(R)-methyl-2′,3′,4′,5′-tetrahydro-1′,3′-oxazino[4′,5′:16β,17β]androst-5-en-3β-ol acetate (IX). Also, when compound (VIII) is heated with methyl iodide in the presence of potassium carbonate, the product 3′,6′(R) - dimethyl - 2′,3′,4′,5′-tetrahydro-1′3′-oxazino[4′,5′:16β17β]androst-5-en-3β-ol (XIII) is obtained. The latter compound (VIII) is also obtained when 16β-methylaminopregn-5-ene-3β,20β-diol (XV) is heated with formaldehyde in a lower alkyl alcohol. The compound 16β-aminopregn-5-ene-3β,20β-diol (V) when reacted with ethyl chloroformate in the presence of pyridine, produces N-carbethoxy-3β,20β-dihydropregn-5-en-16β-yl amine (XII). The latter N-carbethoxy diol (XII) compound when heated with lithium aluminum hydride in the presence of tetrahydrofuran, produces 16β-methyl-amino-pregn-5-ene-3β,20β-diol (XV).

The compounds of the present invention possess antibacterial and antifungal properties and are therefore useful as antibacterial and antifungal agents.

The following examples illustrate in detail the preparation of representative 16,20-ring substituted pregnenes of this invention.

EXAMPLE 1

Preparation of 3β-acetoxy-16α-methanesulfonyloxypregn-5-en-20-one (II)

Treatment of a solution containing 1 g. of 3β-acetoxy-16α-hydroxypregn-5-en-20-one (I) [prepared according to J. Org. Chem., 19, 131 (1954)], in 5 ml. of pyridine with methanesulfonyl chloride (2 ml.) at −5° C. gives, after crystallization of the product from an acetone-water mixture, the corresponding methane sulfonate compound (II): 1.005 g.; melting point 153–155° C. An analytic sample melts at 159.5–160.5° C.; $[\alpha]_D^{25}$ −29° (chloroform);

$\lambda_{max}^{KBr}$ 1742, 1710, 1361, 1248 and 1182 cm.$^{-1}$

EXAMPLE 2

Preparation of 3β-acetoxy-16α-methanesulfonyloxypregn-5-en-20β-ol (III)

A mixture of 5.2 g. of the methanesulfonate-20-one (product of Example 1) and 5.0 g. of sodium borohydride in absolute ethanol (780 ml.) is stirred at room temperature for 75 minutes, whereupon complete solution is effected. The solution is added to ice-water and the resultant precipitate (3.48 g.) crystallized from dilute methanol to give 3β-acetoxy-16α-methanesulfonyloxypregn-5-en-20β-ol (III), melting point 158.5–159° C. Crystallization from a mixture of acetone-hexane gives an analytical sample: melting point 161.5–162° C.; $[\alpha]_D^{25}$ −110° (chloroform);

$\lambda_{max}^{KBr}$ 3502, 1739, 1342, 1260 and 1178 cm.$^{-1}$

EXAMPLE 3

Preparation of 3β-acetoxy-16β-azidopregn-5-en-20β-ol (IV)

A mixture of the methanesulfonate compound (III) (0.57 g.) (product of Example 2) and sodium azide (0.45 g.) in 23.75 ml. of N-methyl-2-pyrrolidone and 1.25 ml. of t-butyl alcohol is heated on the steam bath for 28 hours. Water is added and the resultant amorphous brown solid (0.495 g.) is collected. Crystallization from a mixture of acetone-petroleum ether (boiling range 60–70° C). yields (IV), (0.215 g.) melting point 173–179° C. An analytical sample is obtained from acetone-water, melting point 186.5–187° C.; $[\alpha]_D^{25}$ +19° (chloroform);

$\lambda_{max}^{KBr}$ 3580, 2150, 1738 and 1260 cm.$^{-1}$

EXAMPLE 4

Preparation of 16β-aminopregn-5-ene-3β,20β-diol (V)

A slurry of the 16β-azido compound (IV) (3.73 g.) (product of Example 3) and lithium aluminum hydride (5.0 g.) in 200 ml. of ether is refluxed for 16 hours. The excess hydride is cautiously reacted with a saturated solution of potassium and sodium tartrate. The mixture is filtered and the residue boiled in ethyl acetate. When the ethyl acetate filtrate from the residue is combined with the above ether filtrate, a precipitate (V) (1.475 g.) appears and is collected, melting point 238–242° C. An analytical sample is crystallized from ethyl acetate, melting point 241–242° C.; $[\alpha]_D^{25}$ −51° (methanol);

$\lambda_{max}^{KBr}$ 3300, 1605 and 1050 cm.$^{-1}$

EXAMPLE 5

Preparation of 2',2',6'(R) - trimethyl-2',3',4',5', - tetrahydro - 1',3' - oxazino[4',5':16β,17β]androst - 5 - en-3β-ol (VI)

Reduction of the 16β-azide (IV) (1.09 g.) (product of Example 3) with lithium aluminum hydride 2.0 g.) in 100 ml. ether, as in the preparation of the 16β-amine (V) but crystallizing the resultant solids from acetone-petroleum ether (boiling range 30–70° C.) gives (VI) (0.285 g.) melting point 165.5–167° C. An analytical sample is obtained by crystallization from acetone, melting point 176.5–178.5° C.; $[\alpha]_D^{25}$ −8° (methanol).

The same compound (VI) is also obtained directly by crystallization from the 16β-amine (V) from acetone.

EXAMPLE 6

Preparation of 3'-acetyl-2',2',6'(R)-trimethyl-2',3',4',5'-tetrahydro - 1',3' - oxazino[4',5':16β,17β]androst-5-en-3β-ol acetate (XVII)

Acetylation of the trimethyl - 1,3 - oxazino-3β-ol (VI) (0.445 g.) (product of Example 5) in 10 ml. of pyridine with 1.0 ml. of acetic anhydride is carried out at room temperature for 18 hours. The solution is poured into ice-water and the resultant oil extracted with ethyl acetate. After drying the extract the solvent is removed under reduced pressure to yield an oil. The oil is dissolved in a small amount of methylene chloride and chromatographed on activated magnesium silicate. The eluate from petroleum ether (30–60° C.):acetone (86:14), after removal of the solvents under reduced pressure solidifies upon trituration with ether. Crystallization from acetone-hexane gives 56 mg. of (XVII), melting point 201–204° C. The analytical sample melted at 211–221° C. Elution of the activated magnesium silicate column with petroleum ether (30–60° C.):acetone (83:17) gives 22 mg. of 16β-acetamidopregn-5-ene-3β,20β-diol diacetate.

EXAMPLE 7

Preparation of 2',2',3',6'(R) - tetramethyl - 2',3',4',5'-tetrahydro - 1',3' - oxazino[4',5':16β,17β]androst-5-en-3β-ol (VII)

A mixture of the trimethyl-1,3-oxazine (VI) (0.51 g.) (product of Example 5) potassium carbonate (0.5 g.) and methyl iodide (4.0 ml.) in 50 ml. of acetone is refluxed for 21 hours. The solvent is removed under reduced pressure. Water is added and the mixture is stirred and filtered. The residue is crystallized from dilute acetone to give (VII); 0.36 g., melting point 192.5–195° C. An analytical sample melts at 193–195° C.; $[\alpha]_D^{25}$ −31° (chloroform).

EXAMPLE 8

Preparation of 2',2',3',6'(R)-tetramethyl-2',3',4',5',tetrahydro - 1',3' - oxazino[4',5':16β,17β]androst - 5 - ene-3β-ol acetate (X)

Acetylation of the tetramethyl-1,3-oxazino-3β-ol (VII) (0.155 g.) (product of Example 7) is carried out in the usual manner in 5.0 ml. of pyridine with 1.0 ml. of acetic anhydride at room temperature for 18 hours. After pouring the solution into water, the resultant precipitate (0.13 g.) is collected, melting point 169–175° C. An analytical sample from dilute acetone melts at 179.5–180.5° C.; $[\alpha]_D^{25}$ −39.5° (chloroform).

EXAMPLE 9

Preparation of 3',6'(R) - dimethyl-2',3',4',5'-tetrahydro-1',3',-oxazino[4',5':16β,17β]androst - 5 - en - 3β - ol (XIII) and 3',6'-dimethyl - 2',3',4',5'-tetrahydro-1',3'-oxazino[4',5':16β,17β]androst - 5 - en - 3β - ol formate (XIV)

A mixture of 16β-aminopregn-5-ene-3β,20β-diol (V) (2.125 g.) (product of Example 4) formic acid (30 ml.) and 40% formaldehyde (30 ml.) is refluxed for 4 hours and then poured into ice-water. The water solution is extracted with ether, then made basic with concentrated potassium hydroxide. The precipitate is collected. Crystallization from acetone-water and a recrystallization from acetone-hexane affords 0.41 g. of (XIII), melting point 186°–188° C.; $[\alpha]_D^{25}$ −33° C. (chloroform).

Crystallization from the mother liquors from methanol-water gives 0.196 g. of the formate ester (XIV), point 156–159° C.; $[\alpha]_D^{25}$ −55.5° (chloroform).

EXAMPLE 10

Preparation of 3',6'(R)-dimethyl-2',3',4',5'-tetrahydro-1',3' - oxazino[4',5':16β,17β]androst-5-en-3β-ol, ethyl carbonate (XVI)

To a solution of the 1,3-oxazine (XIII) (0.5 g.) (product of Example 3) in pyridine (10 ml.) at ice-bath temperature is added 1.2 ml. of ethyl chloroformate. The mixture is allowed to stand for 24 hours at room temperature, then is poured into water and the resultant precipitate is collected. Crystallization from a mixture of acetone and water yields 0.405 g. of (XVI), melting point 124–125.5° C. An analytical sample melts at 125–126° C.; $[\alpha]_D^{25}$ —35° (chloroform).

EXAMPLE 11

Preparation of 3',6'(R)-dimethyl-2',3',4',5'-tetrahydro- 1',3'-oxazino[4',5':16β,17β]androst-4-en-3-one (XI)

To a solution of the 1,3-oxazine (XIII) (0.654 g.) the product of Example 9, in 100 ml. of acetone is added, at ice-bath temperature and under nitrogen, 1.0 ml. of a solution of chromic acid (13.36 g.) and concentrated sulfuric acid (11.5 ml.) diluted to a volume of 50 ml. with water. After being stirred under nitrogen for 2½ hours, while permitting the bath temperature to rise to room temperature, the mixture is filtered. The residue is dissolved in a small amount of water, concentrated sodium hydroxide is added and the mixture is extracted with methylene chloride. After being dried, the solution is evaporated under reduced pressure to yield 0.3 g. of an oil which is put on an activated magnesium silicate column (50 g.). Elution with petroleum ether (30–60° C.):acetone mixtures (88–82:12–18) gives a glass (0.17 g.) which shows some α,β-unsaturated ketone chromophore according to its infrared spectrum. This glass is chromatographed on diatomaceous earth and eluted with a heptane:methanol (1:1) system to yield 0.39 g. of (XI), melting point 140–143° C.

EXAMPLE 12

Preparation of 6'(R)-methyl-2',3',4',5'-tetrahydro-1',3'-oxazino[4',5':16β,17β]androst-5-en-3β-ol (VIII)

A solution of 16β-aminopregn-5-ene-3β,20β-diol (V) (0.5 g.) (product of Example 4) in 40% formaldehyde (25 ml.) and methanol (25 ml.) is refluxed for 1½ hours. The methanol is removed under reduced pressure and the precipitate which formed is collected. Crystallization from a mixture of methylene chloride, methanol and ether gives 0.235 g. of (VIII), melting point 252–255° C. An analytical sample melts at 264–266° C.

EXAMPLE 13

Preparation of 3'-acetyl-6'(R)-methyl-2',3',4',5'-tetrahydro-1',3'-oxazino[4',5':16β,17β]androst-5-en-3β-ol acetate (IX)

A mixture of 6'(R)-methyl-2',3',4',5'-tetrahydro-1',3'-oxazino[4',5':16β,17β]androst-5-en-3β-ol (VIII) (0.134 g.) (product of Example 12) in chloroform (4 ml.), pyridine (4 ml.), and acetic anhydride (2 ml.) is heated on a steam bath until solution is effected, about 15 minutes. The solution is left to stand at room temperature for 20 hours, after which time it is poured into water and the resultant solid is collected and put on an activated magnesium silicate column (25 g.). Elution with petroleum ether (30–60° C.):acetone (43:2) gives a solid which crystallizes from acetone-hexane to yield 0.10 g. of (IX), melting point 216–219° C. An analytical sample melts at 224.5–226° C.; $[\alpha]_D^{25}$ —53.3° (chloroform).

EXAMPLE 14

Preparation of 3',6'(R)-dimethyl-2',3',4',5'-tetrahydro-1', 3'-oxazino[4',5':16β,17β]androst-5-en-3β-ol (XIII)

A mixture of the 6'(R)-methyl compound (VIII) (0.866 g.) (product of Example 12) potassium carbonate (1.0 g.), methyl iodide (5.0 ml.) and methanol (50 ml.) is refluxed for 22 hours. The solvent is then removed under reduced pressure. The residue is washed with acetone and the acetone filtrate is treated with a few drops of sodium sulfite solution to remove the color. Further addition of water yields 0.347 g. of (XIII), melting point 185–187° C. with an infrared spectrum identical to that obtained with the previously prepared sample of (XIII), Example 9.

B. From 16β-methylaminopregn-5-ene-3β,20β-diol (XV)

A solution of the 16β-methylamino compound (XV) (0.3 g.) (product of Example 16) in 40% formaldehyde (25 ml.) and methanol (25 ml.) is refluxed for 6 hours. The solvent is removed under reduced pressure, water is added, and the resultant precipitate collected. Crystallization from acetone-water gives 0.176 g. of (XIII), melting point 186–189° C. This sample has an infrared spectrum identical to that obtained with the previously prepared sample of (XIII), Example 9.

EXAMPLE 15

Preparation of N-carbethoxy-3β,20β-dihydroxypregn-5-en-16β-yl-amine (XII)

To an ice-cold solution of 16β-aminopregn-5-ene-3β, 20β-diol, (V), (1.0 g.) the product of Example 4, in pyridine (20 ml.) is added ethyl chloroformate (0.268 g.). The mixture is allowed to stand at ice temperature for ½ hour, and then at room temperature for one hour. The mixture is poured into ice-water and the resultant precipitate is collected and crystallized from dilute methanol to give 0.955 g. of (XII), melting point 191–195° C. An analytical sample is crystallized from acetone-hexane and melts at 197–198.5° C.; $[\alpha]_D^{25}$ —35° (chloroform).

EXAMPLE 16

Preparation of 16β-methylaminopregn-5-ene-3β,20β-diol (XV)

A mixture of the N-carbethoxy-diol (XII) (0.533 g.) (product of Example 15) and lithium aluminum hydride (0.5 g.) in 50 ml. tetrahydrofuran is stirred and refluxed for 4 hours. A saturated solution of potassium and sodium tartrate is added to the refluxed mixture and the resultant mixture is filtered. The residue is stirred in methanol and filtered and the filtrates are combined and taken to dryness under reduced pressure. Crystallization of the residue from methanol-water gives 0.43 g. of the crude product (XV), melting point 194.5–198° C. An analytical sample crystallized from acetone-hexane melts at 216–217° C.; $[\alpha]_D^{25}$ —17° (methanol).

We claim:
1. A pregnene selected from the group having the formulas:

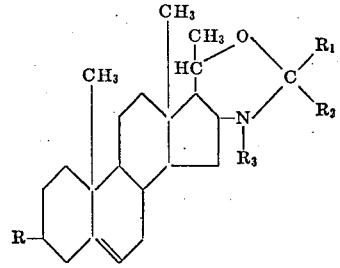

and

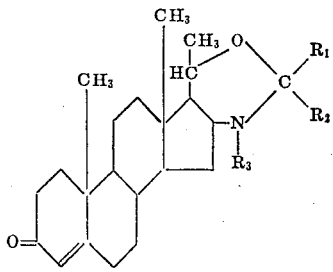

wherein R is selected from the group consisting of hydroxy, lower alkanoyloxy, formyloxy and

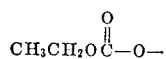

$R_1$ and $R_2$ are selected from the group consisting of hydrogen and lower alkyl; $R_3$ is selected from the group consisting of hydrogen, lower alkyl and lower alkanoyl.

2. A pregnene in accordance with claim 1, 2',2',6'(R)-trimethyl - 2',3',4',5' - tetrahydro-1',3'-oxazino[4',5':16β,17β]androst-5-en-3β-ol.

3. A pregnene in accordance with claim 1, 2',2',3',6'-(R) - tetramethyl-2',3',4',5' - tetrahydro-1',3'-oxazino-[4',5':16β,17β]androst-5-en-3β-ol.

4. A pregnene in accordance with claim 1, 2',2',3',6' (R)-tetramethyl-2',3',4',5' - tetrahydro-1',3' - oxazino-[4',5':16β,17β]androst-5-en-3β-ol acetate.

5. A pregnene in accordance with claim 1, 3',6'(R)-dimethyl-2',3',4',5' - tetrahydro-1',3' - oxazino[4',5':16β,17β]androst-5-en-3β-ol, ethyl carbonate.

6. A pregnene in accordance with claim 1, 3',6'(R)-dimethyl-2',3',4',5' - tetrahydro-1',3' - oxazino[4',5':16β,17β]androst-4-en-3-one.

7. A pregnene in accordance with claim 1, 6'(R)-methyl - 2',3',4',5' - tetrahydro-1',3' - oxazino[4',5':16β,17β]androst-5-ene-3β-ol.

8. A pregnene in accordance with claim 1, 3'-acetoyl-6'-(R) - methyl - 2',3',4',5' - tetrahydro - 1',3'-oxazino-[4',5':16β,17β]androst-5-en-3β-ol-acetate.

9. A pregnene in accordacne with claim 1, 3',6'(R)-dimethyl-2',3',4',5' - tetrahydro-1',3' - oxazino[4',5':16β,17β]androst-5-en-3β-ol.

10. A pregnene in accordance with claim 1, 3'-acetyl-2',2',6'(R)-trimethyl-2',3',4',5' - tetrahydro-1',3'-oxazino-[4',5':16β,17β]androst-5-en-3β-ol acetate.

References Cited
UNITED STATES PATENTS 2,750,380   6/1956   Dodson et al.
2,937,168   5/1960   Dodson.

HENRY A. FRENCH, *Primary Examiner.*